United States Patent [19]

Appleby et al.

[11] 4,437,915
[45] Mar. 20, 1984

[54] METHOD OF CURING REMOVABLE TREAD BELT

[75] Inventors: Paul E. Appleby, Cuyahoga Falls; Max D. Brinkley, North Canton, both of Ohio

[73] Assignee: The Goodyear Tire & Rubber Company, Akron, Ohio

[21] Appl. No.: 310,448

[22] Filed: Oct. 13, 1981

[51] Int. Cl.³ .................... B29H 17/02; B60C 11/02; B29H 21/04
[52] U.S. Cl. .................... 156/126; 156/129; 156/289; 156/127; 152/176; 152/188; 152/361 R; 152/361 FP; 264/501; 264/130; 264/326; 425/46
[58] Field of Search ............ 152/172, 175–177, 152/187–189, 209, 361 R, 361 DM, 361 FP; 156/126–127, 129, 95–96, 128.1, 128.6, 289, 128 R; 264/501; 425/46; 264/130, 326

[56] References Cited

U.S. PATENT DOCUMENTS

| 1,478,156 | 12/1923 | Whitcomb | 152/187 |
| 3,452,797 | 7/1969 | Maiocchi | 152/187 |
| 3,578,052 | 5/1971 | Petersons | 152/187 |
| 3,757,844 | 9/1973 | Verdier | 152/361 FP |
| 3,815,651 | 6/1974 | Neal | 156/96 |
| 4,092,196 | 5/1978 | Miller et al. | 156/96 |
| 4,304,618 | 12/1981 | Abbot | 152/188 |

FOREIGN PATENT DOCUMENTS 1213574 11/1970 United Kingdom ............... 156/128

*Primary Examiner*—Lois E. Boland
*Attorney, Agent, or Firm*—T. P. Lewandowski; Frederick K. Lacher

[57] ABSTRACT

The annular tread belt body is assembled of uncured resilient material having reinforcing cords and is then mounted on a precured tire casing. The read belt body is assembled with a predetermined configuration at a radially inner surface and the precured tire casing has a matching predetermined configuration on the radially outer surface for mounting of the tread belt in a centered position on the tire casing. The tread belt body and precured tire casing are enclosed in a segmental mold where the tread belt is cured. After removal from the mold, the tread belt is separated from the tire casing. The tread belt is then mounted on the radially outer surface of a tire having reinforcing cords positioned in a generally radial direction relative to the axis of the tire.

11 Claims, 8 Drawing Figures

METHOD OF CURING REMOVABLE TREAD BELT

This invention relates generally as indicated to a removable or replaceable tread belt for mounting on a tire.

Heretofore removable tread belts have been built on a core and then cured in a special mold. The mold was usually segmental with segmental rings positioned radially outward and radially inward of the tread belt. Pressure was applied to the segments by expandable bladders or other devices for molding the tread belt under heat and pressure.

The cost of these special molds has been high especially for the large size truck tire tread belts and when a limited number of tread belts are needed for development purposes.

Problems have also been experienced in sealing the joint between the edge of the tread belt and the tire casing which has opened up and permitted the entry of abrasive material causing excessive chafing and wear. This has been particularly critical where the tire was relatively narrow as, for example, a truck tire for dual wheel mounting.

The present invention is directed to a tread belt and tire assembly in which there is compression between the mating surfaces of the tread belt and the tire at the edges of the tread belt and at the shoulders of the tire to resist the pulling away of the tread belt edges from the tire casing shoulders. Where the tire is relatively narrow and the tread width cannot be reduced, the molded diameter of the tread mating surfaces at the edges is less than the molded diameter of the corresponding mating surfaces at the shoulders of the tire casing to provide the high compression at the edges of the tread belt which is necessary to resist pulling away of the tread belt edges.

The tread belt of this invention is built on a collapsible drum and then mounted on a precured tire for curing in a segmental mold. After curing the tread belt is removed from the precured tire. The tread belt may have a belt of high modulus reinforcing cords and the tire on which it is mounted may have radially extending reinforcing cords. Also an expansion-limiting belt may be positioned in the crown area of the tire with relatively light bias cords to permit shaping of the tire but limit expansion for molding in a two-piece mold.

In the manufacture of the tread belt of the present invention, the same precured tire casing may be used many times to cure a number of different tread belts. Also the mold for curing the tread belt may be a tire mold which can also be used to cure and shape conventional tires. Therefore the cost is not as great as it is when special molds must be made for the tread belts.

In accordance with one aspect of this invention there is provided a method of curing an annular tread belt body of uncured resilient material having reinforcing cords of high modulus material comprising: (a) mounting the annular tread belt body on a radially outer surface of a precured tire casing having a curing medium chamber therein; (b) supporting the tire casing in a segmental mold having radially movable segments for engagement with the tread belt body; (c) closing the mold; (d) transmitting a curing medium at high temperatures and pressures into the chamber within the tire casing to press the radially outer surface of the tread belt body into molding contact with the segments; (e) curing the tread belt body in the mold at predetermined temperatures and pressures for a predetermined period of time; (f) reducing the pressure of the curing medium in the chamber within the tire casing; (g) opening the mold; and (h) removing the tread belt from the tire casing.

Figure 1:
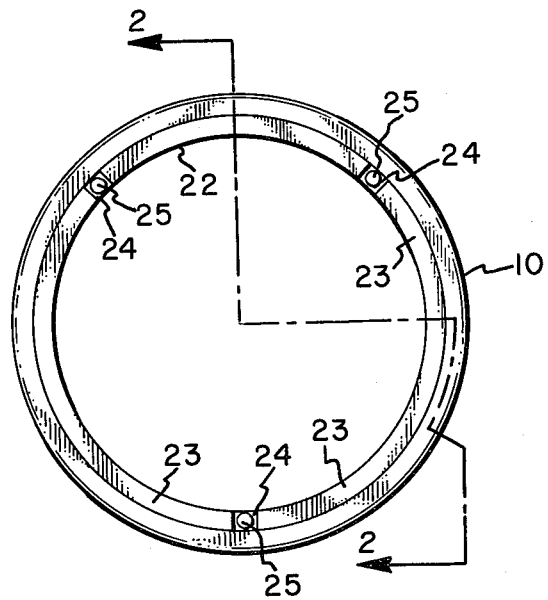
FIG. 1 is a schematic end view of a collapsible cylindrical member on which the tread belt is assembled showing a tread belt in the assembled condition.
Figure 2:
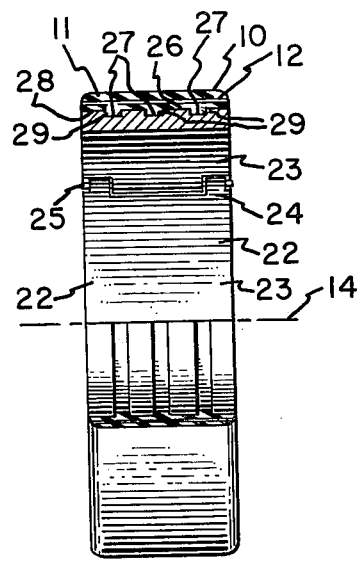
FIG. 2 is a sectional view taken along the line 2—2 in FIG. 1 showing the grooves in the cylindrical member and the matching ribs in the tread belt.
Figure 7:
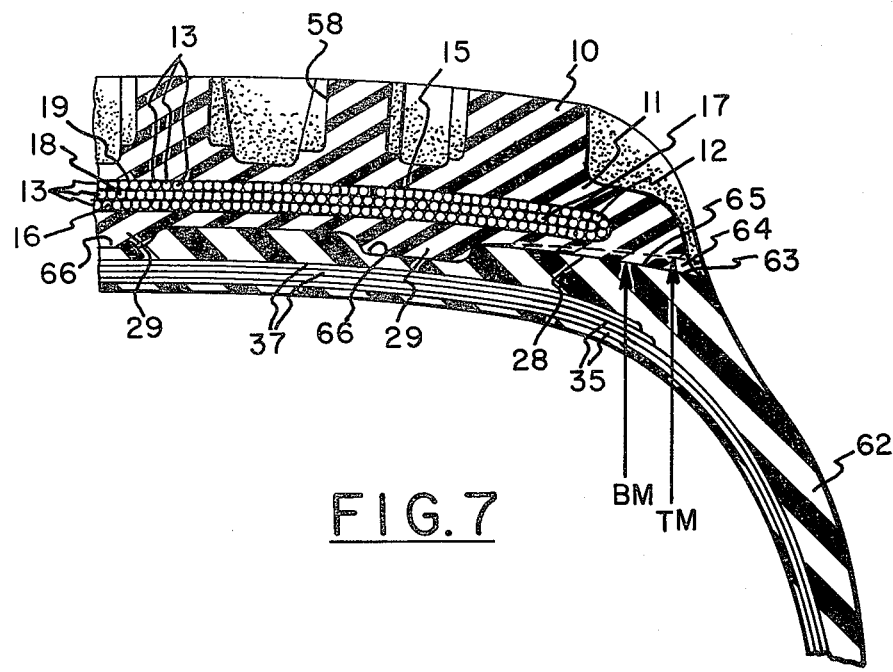
FIG. 7 is an enlarged fragmentary sectional view of the cured tread belt mounted on the tire.

Referring to FIGS. 1, 2 and 7, a tread belt 10 is shown having an annular tread belt body 11 of resilient material reinforced by a belt 12 of cords 13 of high modulus material which may be positioned at desired angles relative to a plane perpendicular to an axis 14 of the tread belt as shown in FIG. 2. The cords 13 of high modulus material may be of steel, aramid or other suitable materials. As shown in FIG. 7, the belt 12 may consist of three plies of circumferentially extending cords 13 with edges 15 of an inner ply 16 folded over the edges 17 of a middle ply 18 and an outer ply 19 positioned between the folded edges of the inner ply.

As shown in FIGS. 1 and 2, the tread belt 10 is assembled on a collapsible cylindrical member 22 having segments 23 connected by hinges 24 so that after the tread belt is assembled on the cylindrical member the segments may be folded inwardly as by removing hinge pins 25 from one of the hinges. Preferably radially outer surface 26 of the cylindrical member 22 has a predetermined configuration which, in this embodiment, includes circumferentially extending grooves 27 at axially spaced positions around the collapsible cylindrical member. Radially inner surface 28 of the tread belt 10 is shaped to conform with the outer surface 26 of the cylindrical member 22 during the assembly process and provides matching ribs 29 in the radially inner surface of the tread belt. Utilizing well known tire building procedures, the annular tread belt body 11 of uncured resilient material and the plies 16, 18 and 19 of the belt 12 are assembled on the collapsible cylindrical member 22 after which the segments 23 are folded inwardly and the assembled tread belt 10 removed in a condition ready for the curing operation.

Figure 3:
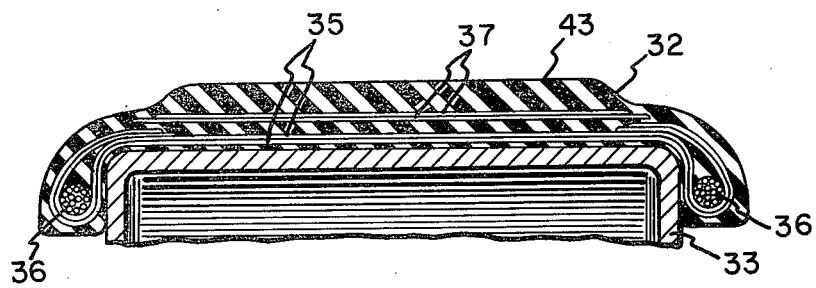
FIG. 3 is a fragmentary sectional view of the tire building drum and the tire casing as assembled on the drum.
Figure 4:
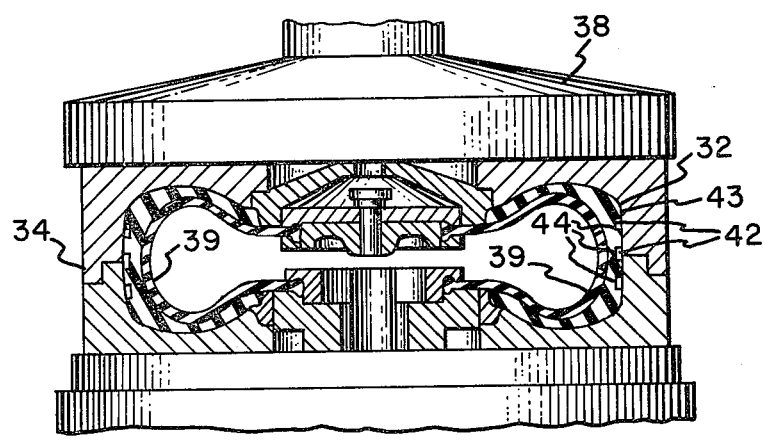
FIG. 4 is a schematic sectional view of a tire vulcanizer having a two-piece mold in which the tire casing is shown being cured.

Referring to FIGS. 3 and 4, a tire casing 32 is shown assembled on a collapsible cylindrical tire building drum 33 in FIG. 3 and during the vulcanization process in a two-piece mold 34 in FIG. 4. The tire casing 32 is built or assembled with reinforcing plies 35 of radial cords extending between annular beads 36 in bead portions of the tire casing. The radially extending reinforcing cords of the reinforcing plies 35 may be of a high modulus material such as aramid, nylon or rayon.

Positioned radially outward of the plies 35 are at least two overlapping belt plies 37 having cords extending at a bias angle to a plane perpendicular to the axis of the tire building drum 33. The cords of the overlapping belt plies 37 extend at equal and opposite angles to a plane perpendicular to the axis of the tire building drum 33. The belt plies 37 may be of low strength cords which will serve to restrict the expansion of the tire casing 32 beyond a predetermined diameter for insertion in the two-piece mold 34 of a conventional tire press 38 of the type shown in FIG. 4. The tire press 38 has a bladder 39 over which the assembled tire casing 32 of FIG. 3 can be loaded and the bladder placed in an extended condition. Then upon closing of the press 38 with the mold sections of the two-piece mold 34 being moved together to the position shown in FIG. 4 and the bladder 39 inflated during the closing, the tire casing 32 will assume the position shown in the two-piece mold. During the curing process which takes place at temperatures and pressures determined in accordance with conventional tire vulcanizing practices the tire casing 32 is cured and grooves 42 formed in radially outer surface 43 by ribs 44 in the mold 34. Other configurations may be molded in the radially outer surface 43; however, in this case, the grooves 42 in the radially outer surface of the tire casing 32 are molded to receive the ribs 29 in the tread belt 10 described heretofore. After curing of the tire casing 32 in the tire press 38, the press is opened and the tire casing unloaded from the press.

Figure 5:
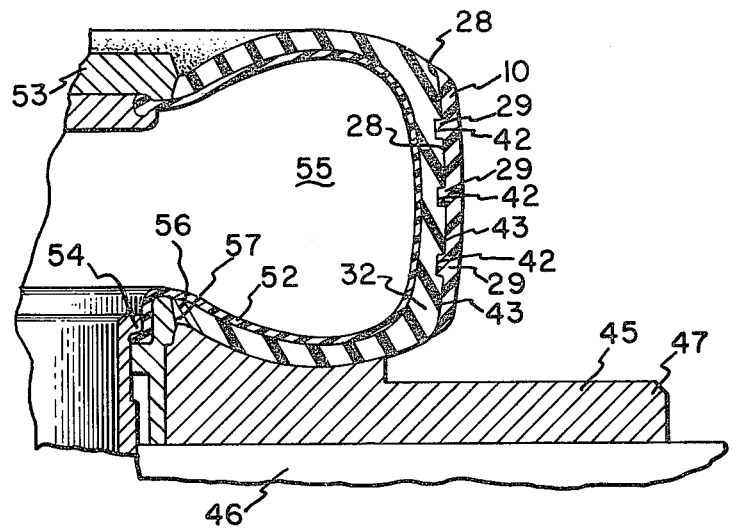
FIG. 5 is a fragmentary sectional view a portion of a segmental tire vulcanizer showing the inflated precured tire casing with the uncured tread belt mounted thereon.
Figure 6:
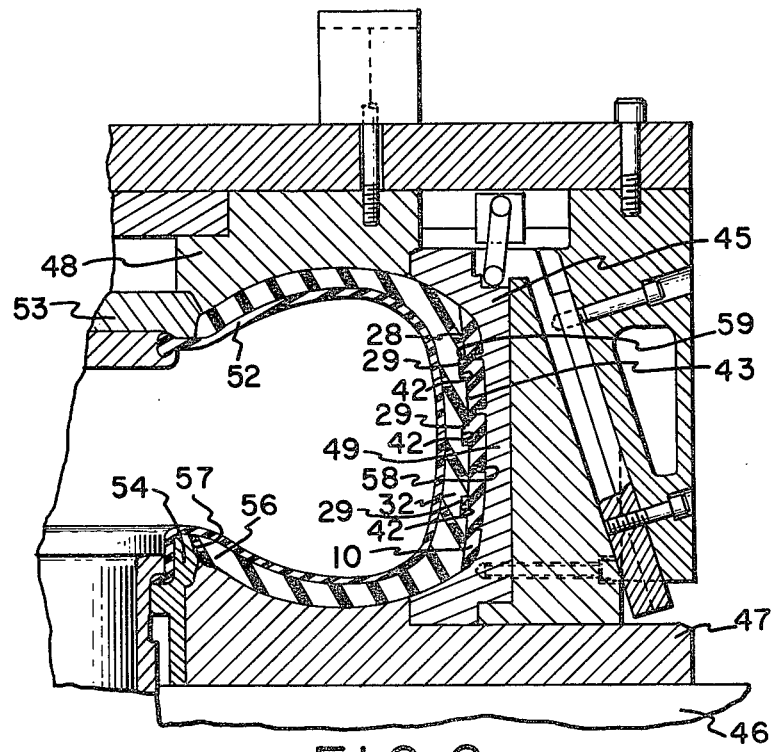
FIG. 6 is a view like FIG. 6 but showing the segmental mold closed for vulcanizing the tread belt while mounted on the precured tire casing.

Referring to FIGS. 5 and 6, the tire casing 32 is shown in a segmental mold 45 mounted on a conventional tire press 46. The segmental mold 45 is of the type shown in U.S. Pat. No. 3,779,677 assigned to the assignee of this patent application. In FIG. 5, the precured tire casing 32 is shown in the mold 45 in the open condition with the tire casing resting on lower sidewall mold plate 47. Upper sidewall mold plate 48, radially movable tread mold segments 49 and the mechanism attached to the tread mold segments are in the raised position providing access to the radially outer surface 43 of the tire casing 32.

As shown in FIG. 5, the tire press 46 has a shaping bladder 52 mounted on an upper head 53 and on a lower bladder clamping member 54 and the bladder extends into a curing medium chamber 55 within the tire casing 32. The shaping bladder 52 is generally cylindrical in the extended condition with the upper head 53 raised from the position shown in FIGS. 5 and 6. The tire casing 32 is placed over the upper head 53 and the bladder 52 and then moved downwardly so that a lower bead portion 56 of the tire casing is seated on a bead seat 57 of clamping member 54 and the lower sidewall is supported by the lower sidewall mold plate 47. The upper head 53 is then lowered while air is communicated under pressure into the bladder 52 to urge the bladder into the curing medium chamber 55 of the tire casing 32 to the position shown in FIG. 5. After the shaping bladder 52 is inserted in the tire casing 32, the air pressure is reduced so that the assembled tread belt 10 may be positioned on the tire casing. This may be done manually or by suitable loading mechanism.

As shown in FIG. 5, the radially inner surface 28 of the tread belt 10 has ribs 29 which match the grooves 42 in the radially outer surface 43 of the tire casing 32 so as to center the tread belt on the tire casing. When the tread belt 10 is in the desired position, air is again communicated under pressure into the curing medium chamber 55 of the tire casing 32 to hold the tread belt in place while the upper sidewall mold plate 48 and radially movable tread mold segments 49 plus the actuating mechanism are lowered to the position shown in FIG. 6. After lowering the upper sidewall mold plate 48, the radially movable tread mold segments 49 are moved radially inward into engagement with the tread belt 10 upon closing of the mold 45. The assembled tread belt 10 may then be cured at predetermined temperatures and pressures in accordance with conventional tire molding practices by heating the mold 45 and communicating a heated curing medium under pressure into the shaping bladder 52 surrounding the curing medium chamber 55. The tread belt 10 may then be molded with a tread configuration 58 conforming to a radially inner surface 59 of the tread mold segments 49 and be subjected to the predetermined temperatures and pressures for a predetermined period of time in accordance with vulcanizing procedures well known to those skilled in the art.

The tire press 46 is then opened during which time the tread mold segments 49 are moved radially outward and then upward away from the tire casing 32 and cured tread belt 10. The tire casing 32 with the tread belt 10 attached may be removed from the tire press 46 by a tire unloader of a type conventionally used with this type of press. The tread belt 10 may then be removed from the tire casing 32 and is in condition for mounting on a tire 62. As shown in FIG. 7, the tire 62 may have the same construction as the tire casing 32 and may be molded in the same way in the two-piece mold 34.

Shoulder joints 63 between edges 64 of the tread belt 10 and radially outer surfaces 65 at the tire shoulder portions have a tendency to pull open especially when the tire 62 is relatively narrow. To counteract this tendency, precompressed shoulder joints 63 may be provided between the tread belt 10 and tire 62. Precompression may be obtained by molding the annular tread belt body 11 with a molded diameter BM of the radially inner surface 28 at the edges 64. This diameter BM is less than the molded diameter TM of the radially outer surface 65 at the tire shoulder portions as shown in dotted lines in FIG. 7. When the tread belt 10 is mounted on the tire 62, the joints 63 will have a diameter substantially the same as the molded diameter BM of the radially inner surface 28 at the edges 64 of the tread belt 10. The tire 62 has grooves 66 similar to the grooves 42 of the tire casing 32 for matching engagement with the ribs 29 of the tread belt 10.

Figure 8:
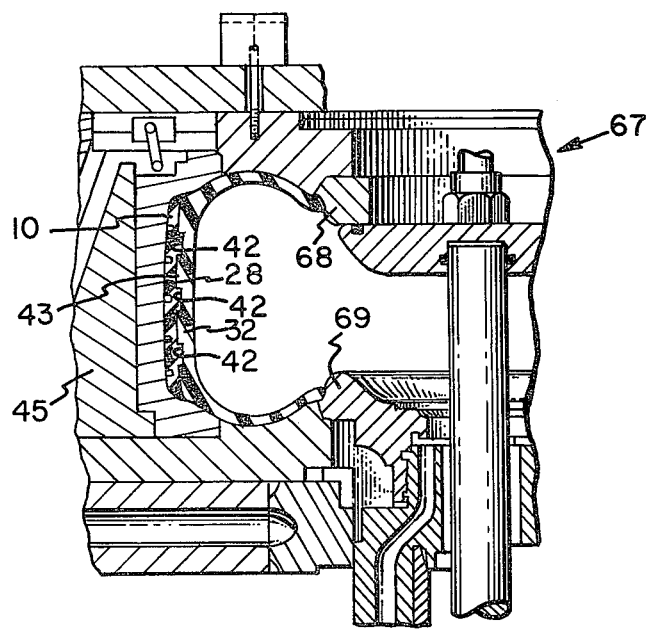
FIG. 8 is a fragmentary sectional view of a modification of the method of this invention with the tread belt being cured in a segmental mold and the precured tire being inflated without a bladder.

Referring to FIG. 8, a modification of the tread belt curing process is shown in which a tire press 67 is of a bladderless type and no bladder is used to inflate the tire casing 32 or contain the curing medium. Instead the tire casing 32 is mounted on bead rings 68 and 69 of the tire press 67 and the inflating air is communicated directly into the tire casing for positioning of the assembled tread belt 10 on the tire casing. The tread belt 10 is cured within the segmental mold 45 in the same manner as described hereinabove except that the curing medium is contained by the precured tire casing 32 and no shaping bladder is required.

In the process of curing shown in FIGS. 6 and 8, the removal of the tread belt 10 from the tire casing 32 may be facilitated by applying a release agent coating to the radially outer surface 43 of the tire casing before the uncured assembled tread belt is positioned thereon. Then after removal of the tire casing 32 and cured tread belt 10 from the tire press 46 or 67 the tread belt may be separated from the tire casing with greater ease.

While certain representative embodiments and details have been shown for the purpose of illustrating the invention, it will be apparent to those skilled in the art that various changes and modifications may be made therein without departing from the spirit or scope of the invention.

What is claimed is:

1. A method of curing an annular replaceable tread belt body of uncured resilient material having reingorcing cords of high modulus material comprising:
   a. mounting said annular tread belt body on a radially outer surface of a precured tire casing having a curing medium chamber therein;
   b. supporting said tire casing in a segmental mold having radially movable segments for engagement with said tread belt body;
   c. closing said mold;
   d. transmitting a curing medium at high temperatures and pressures into said chamber within said tire casing to press the radially outer surface of said tread belt body into molding contact with said segments;
   e. curing said tread belt body in said mold at predetermined temperatures and pressures for a predetermined period of time;
   f. reducing the pressure of said curing medium in said chamber within said tire casing;
   g. moving said radially movable segments radially outward out of engagement with said tread belt body;
   h. opening said mold; and
   i. removing said tread belt from said tire casing.

2. The method of claim 1 wherein said cords of high modulus material are steel.

3. The method of claim 1 wherein said cords of high modulus material are arranged in three plies with a middle ply extending from edge portion to edge portion of said tread belt body, a radially inner ply having overlapping edges extending around the edges of said middle ply and a radially outer ply extending between the overlapping edges of said inner ply.

4. The method of claim 1 wherein said annular tread belt body is assembled with a predetermined configuration at a radially inner surface and said precured tire casing has a matching predetermined configuration on said radially outer surface for mounting of said tread belt body in a centered position on said tire casing.

5. The method of claim 4 wherein said configuration on said tire casing and said tread belt body comprises circumferentially extending matching grooves and ribs.

6. The method of claim 4 wherein said precured tire casing is cured in a mold having a radially inner surface for molding said matching predetermined configuration on said radially outer surface of said tire casing.

7. The method of claim 1 wherein said precured tire casing is reinforced with cords positioned generally radially relative to the axis of said tire.

8. The method of claim 1 wherein said precured tire casing is assembled in a generally cylindrical shape and then shaped to a generally toroidal configuration and said tire casing has at least two reinforcing belt plies in the crown portion with cords positioned at a bias relative to the axis of said tire to limit the expansion of the tire during shaping.

9. The method of claim 1 wherein a curing bladder is positioned in said curing medium chamber of said precured tire casing for containing said curing medium.

10. The method of claim 1 wherein said curing medium chamber within said tire casing is closed at the bead portions of said tire for direct contact of said curing medium with the inner surface of said tire for bladderless curing.

11. The method of claim 1 wherein said annular tread belt body is molded with the molded diameter of the radially inner surface at the shoulder portions of the body being smaller than the molded diameter of the radially outer surface at the shoulder portions of a tire on which the tread belt is mounted for operation on a vehicle providing precompressed shoulder joints between the tread belt and the tire.

* * * * *